United States Patent [19]
Deal

[11] Patent Number: 4,759,664
[45] Date of Patent: Jul. 26, 1988

[54] METHOD OF BUILDING OR RESTORING MARSHES AND BEACHES

[76] Inventor: Troy M. Deal, 277 Trismen Ter., Winter Park, Fla. 32789

[21] Appl. No.: 724,251

[22] Filed: Apr. 17, 1985

Related U.S. Application Data

[63] Continuation-in-part of Ser. No. 681,071, Dec. 12, 1984, which is a continuation of Ser. No. 579,805, Feb. 17, 1984, abandoned, which is a continuation of Ser. No. 221,219, Dec. 30, 1980, abandoned.

[51] Int. Cl.$^4$ ............ E02D 3/00; E02D 17/00; E02F 5/00; E02F 3/88
[52] U.S. Cl. ................ 405/258; 405/117; 405/303; 37/54; 37/66; 37/195
[58] Field of Search ............ 405/15, 52, 74, 217, 405/258, 107, 222, 263; 299/9; 37/54, 195, 66

[56] References Cited

U.S. PATENT DOCUMENTS

| | | | |
|---|---|---|---|
| 1,404,112 | 1/1922 | Goebl et al. | 405/258 |
| 1,844,348 | 2/1932 | Claybourn et al. | 406/97 |
| 2,158,046 | 5/1939 | Prendergast | 405/74 |
| 2,191,845 | 2/1940 | Bretting | 405/258 |
| 2,818,682 | 1/1958 | Finn | 405/258 |
| 2,926,437 | 3/1960 | Ellicott, Jr. | 37/72 |
| 3,521,387 | 7/1970 | Degelman | 37/66 |
| 3,638,432 | 2/1972 | Schoonmaker | 405/74 |
| 3,786,639 | 1/1974 | Pineno et al. | 405/267 |
| 3,842,607 | 10/1974 | Kelseaux et al. | 405/217 |
| 4,261,117 | 4/1981 | Van Der Peyl | 37/58 |
| 4,397,587 | 8/1983 | Op den Velde et al. | 405/217 |
| 4,523,879 | 6/1985 | Finucane et al. | 405/217 |
| 4,567,731 | 2/1986 | Horan | 405/217 |
| 4,614,458 | 9/1986 | Austin | 405/74 |

OTHER PUBLICATIONS

J. G. Riley, *How Imperial Built First Arctic Island*, 1974.
Articles from Various Florida Newspapers, 1979.
"New Machine Clears Weed-Choked waterways", *North Port News*, Feb. 15, 1979.

Primary Examiner—Randolph A. Reese
Assistant Examiner—John A. Ricci
Attorney, Agent, or Firm—Beaman & Beaman

[57] ABSTRACT

The invention pertains to a method for the building or restoration of marshes and beaches wherein a slurry of solid material and water is formed at one location and pumped to a remote location for uniform distribution of the slurry over a large area to substantially increase the elevation for the purpose of building a marsh, restoring a beach, or the like. The slurry is distributed by a high pressure nozzle uniformly directing a spray which falls in a mist over the area on which the slurry is deposited to produce a significant elevational increase in the area. The nozzle may make alternate directional sweeps, or rotate in a common direction to cover a circular area, with various adjustable vertical angles and pressure variations to control distribution.

16 Claims, 1 Drawing Sheet

METHOD OF BUILDING OR RESTORING MARSHES AND BEACHES

BACKGROUND OF THE INVENTION

This application is a continuation-in-part application of Ser. No. 06/681,071 which was filed Dec. 12, 1984, which was a continuation of Ser. No. 06/579,805 filed Feb. 17, 1984, now abandoned, which was a continuation of Ser. No. 06/221,219 filed Dec. 30, 1980, now abandoned.

Previous marsh building methods involve the placement of material in relatively shallow waters by the discharge from a dredge pipe of a slurry at high volume and low pressure being supplied from a suction dredge. The pumped slurry discharged from the dredge pipe end, by gravity, is dispersed over the region adjacent the pipe outlet. This method of dispensing of the pumped material results in an island located adjacent the dredge pipe outlet, and a series of islands as the pipe is successively moved over the area to be built. The composition of the material of these islands varies in that the heavy and denser material of the slurry would not flow far from the pipe outlet, but the finer and more desirable organic materials would flow a greater distance from the pump outlet running off into the valleys of lower elevation. Thus, at each location of the dredge outlet an island is formed having the denser materials located adjacent the island center, while the lighter and finer materials, particularly those of organic composition, would be located at the outer regions of the island.

After drying, leveling or mixing of the material of the islands is usually impractical because of their location, and the expense involved. The islands become permanent to the built-up marsh or upland and the reconstructed land does not have a consistent composition throughout its area, which affects the vegetation and marsh development, and also produces an inconsistent density permitting holes, hard spots, knolls and the like as the finer material usually washes away.

Attempts have been made to control island building and uneven distribution of the pumped material by the use of containment ponds receiving the slurry. However, the use of containment ponds to improve the consistency of material distribution has been relatively ineffective as the discharge of the slurry into a confined body of water still permits separation of the different sizes of particles and an uneven buildup of material is difficult to prevent.

For successful marsh building it is very important that a desired predetermined elevation be achieved as the desired habitat and vegetation only occurs in a limited elevational range subject to the proper flow and ebb of water flooding. With conventional marsh building techniques, it is difficult to maintain the desired elevations because of the uneven impermanent distribution and the spot segregation of the deposited material and the inability to accurately obtain sloping placements for transition zones.

Similar problems exist in the nourishment of beaches. The rebuilding or nourishment of beaches is normally accomplished by pumping sand dredged from an offshore location through a pipe onto the beach. The sand and water slurry discharged from the pump outlet produces an island about the outlet with the larger and heavier particles closer to the island center while the lighter and finer particles flow a greater distance from the outlet. While these islands are easier to knock down and smooth over when defined on a beach as compared to a marsh, the problem of the inconsistency of material size distribution continues, and beaches renourished in the conventional manner will not have uniform size and weight particle distribution which results in nonlevel elevations as the beach is subjected to waves and rain. Further, because of the non-cohesiveness resulting from the segregation of the pumped material, beaches nourished by conventional methods do not have the original durability.

In the above identified applications method and apparatus is shown for spraying dredged material over a relatively large area wherein the distribution of the dredged material is substantially uniform with respect to particle size and composition, and in these applications the pumped material is distributed as a thin film to produce minimal elevation of the area upon which the material is deposited and thereby have minimal adverse environmental impact. In these applications the disclosed apparatus uses dredged material and high pressure pumps to spray a slurry over an area either adjacent the dredge, or remote from the dredge, and diffusion and nozzle positioning means at the high pressure nozzle outlet may be used to aid in the even distribution of the pumped material over the area being covered. However, in the prior applications, the use of the disclosed apparatus for marsh rebuilding or beach nourishment was not contemplated as the necessary increase in elevation of the area would significantly modify the environment, and not be environmentally acceptable, which is contrary to a basic concept of the prior applications.

It is an object of the invention to provide a method for building marshes or restoring beaches using a pumped slurry wherein the slurried material is evenly distributed over the area whose elevation is to be increased, the composition of the deposited material being substantially uniform with respect to size and weight.

Another object of the invention is to provide a method for building marshes or restoring beaches wherein the distribution of the restoring material is such as to avoid islands and elevational variations other than designed and wherein the composition of the distributed material will be substantially uniform regardless of the deposited distance from the discharge outlet.

Yet another object of the invention is to provide a method for building marshes and restoring beaches using a pumped slurried material wherein the mode of uniformly distributing the material over the area to be built or nourished may be varied to accommodate the particular area configuration.

In the practice of the invention slurrying apparatus which may be stationary or may take the form of a suction dredge located within a waterway having a rotating cutterhead comminuting the material to be used in the marsh building or beach restoration includes powerful pumps for pumping the resultant slurry of material and water to a nozzle located on a distribution barge or platform remote from the slurrying apparatus.

The high pressure nozzle on the distribution platform is elevated to spray the pumped material into the air over the area to be built up. The nozzle is supported on a movable means permitting rotation or oscillation of the nozzle both horizontally and vertically, and a diffuser may be located adjacent the nozzle to disperse the water column projecting therefrom.

The distribution platform may be located offshore of a beach to be nourished, or a marsh area to be rebuilt, and the nozzle moved across the area to be elevated with an alternating sweeping motion. If the area to be elevated is large and not closely defined by boundaries or a shoreline, the distribution platform may be located within this area permitting the nozzle to rotate about a vertical axis through 360° to deposit the material in a circle about the distribution platform.

The operation of the nozzle may be remotely controlled, and the dispersed material will fall like rain or mist over the area to be elevated thereby producing a uniform distribution of the material without segregation regardless of the distance from the distribution nozzle.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
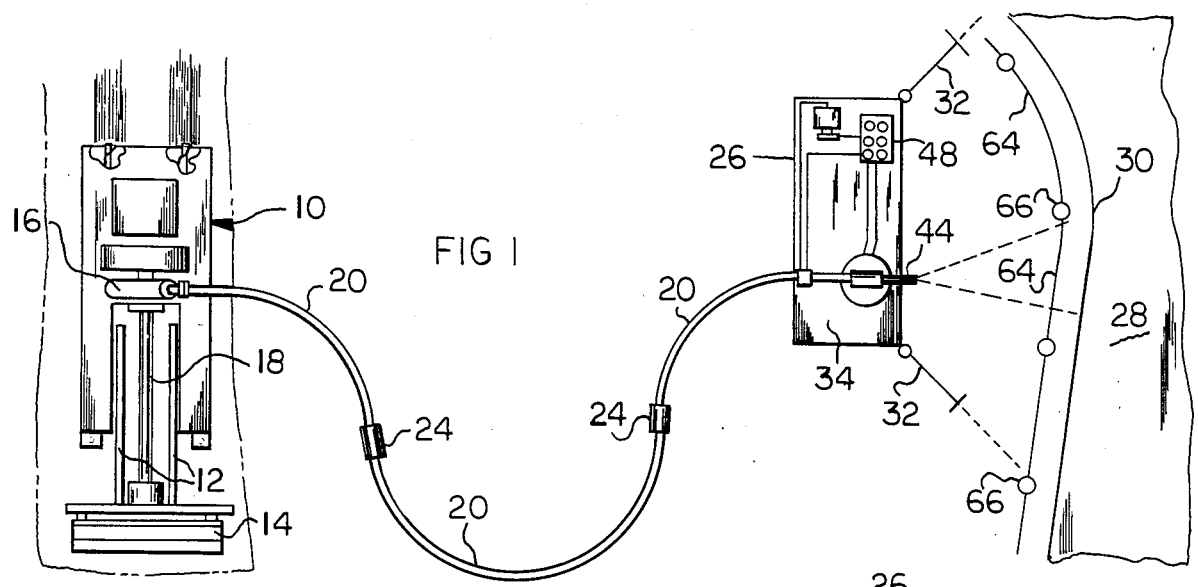
FIG. 1 is a plan view of the suction barge and distribution barge wherein the distribution barge is mounted off-shore of the area to be elevated.
Figure 2:
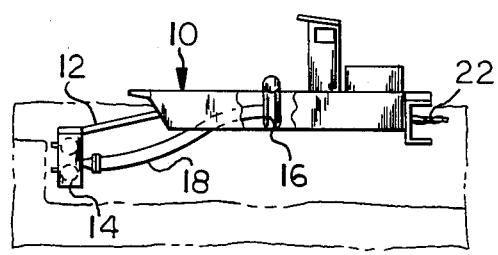
FIG. 2 is a side elevational view of a typical suction barge used in the practice of the invention.
Figure 3:
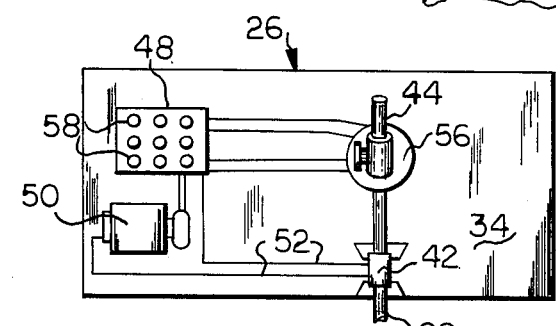
FIG. 3 is an enlarged, detail, plan view of the distribution barge.

The invention pertains to the method of building marshes and beaches and the particular source for the building material does not constitute an aspect of the invention. In the building of marshes, inorganic material, sand, silt, consolidated spoils, comminuted organic vegetation and upland material, and the like, may be employed. In the building or restoration of beaches sand comprises the principle ingredient of the building material.

The marsh and beach building material is sprayed over the area being built-up by high pressure pumps, and accordingly, must be in a pumpable form, such as a slurry consisting of the solid material and water. This slurry may result from the dredging of natural bottom material from a body of water by a suction dredge, or may be produced by other slurry producing apparatus of conventional nature. For instance, the slurry may be produced by pumpable solid material and water being mixed in a large tank or receptacle and pumped therefrom, or the pumpable material may be deposited in a pond or body of water and removed therefrom by a suction dredge. The particular manner by which the slurry is formed does not constitute a part of the present invention and it is to be understood that conventional slurry producing apparatus may be used in the practice of the invention.

The most common, and economical, method for producing the slurry for building marshes and beaches is to use a suction dredge which is dredging the natural bottom of a body of water near the area to be built up, or the suction dredge could be located in a pond to which solid material is being transported and deposited.

In the drawings a suction dredge is shown by way of illustration as the source of the slurried material and the suction dredge 10 includes a ladder 12 supporting a cutterhead 14 which may be raised or lowered by the ladder by hydraulic cylinders, not shown. A pump 16 mounted on the barge communicates with the cutterhead 14 through suction line 18 and draws the comminuted material from the cutterhead into the pump 16 for discharge through the high pressure pipe or hose 20. The barge 10 is propelled by propellers 22 and the details of the cutterhead 14 form no part of the instant invention, and this apparatus may take the form shown in my U.S. Pat. No. 3,971,148.

The pipe or hose 20 is of a generally flexible type and includes floats 24 and is of considerable length wherein the suction barge may take a number of passes while supplying a single location of the distribution barge.

In FIG. 1 the distribution barge 26 is shown as located anchored slightly offshore of an area 28 defined by a shoreline 30, which may constitute an area in which a marsh is to be built, or a beach built or renourished.

The distribution barge 26 may be held in position by deadmen 32, or otherwise anchored, and includes a deck 34 having a nozzle support upright 36 vertically mounted thereon. The support 36 includes a manifold 38 communicating with the conduit 40 which communicates with the fitting 42 mounted on the barge to which the supply pipe 20 is affixed.

A nozzle 44 is pivotally attached about a horizontal axis to the upper region 46 of the upright 36 and in communication with the upright so as to receive the pressurized slurry from the manifold 38. The manifold 38 is of the rotary type wherein the upper region 46 of the nozzle support may rotate through 360° about a vertical axis.

The direction of discharge of the nozzle 44 may be either controlled from the distribution barge 26 or from the suction barge 10, remotely, and to this end, a control unit 48 is mounted upon the distribution barge deck which is connected to a self-contained power unit 50 also mounted on the barge and controlled by control line 52 attached to the pipe 20 at fitting 42 and extending to the suction dredge 10. The control unit 48 through solenoid valves, not shown, controls the expansible motor 54 mounted upon the upper region 46 of the nozzle support which adjusts the elevation of the nozzle 44, and a rotary hydraulic motor 56 affixed to the upper region 46 of the nozzle support and controlled by unit 48 will rotate the nozzle about its vertical axis to control the horizontal direction of distribution. Manually operated controls 58 are included on the control unit 48 whereby an operator on the distribution barge may directly control the direction of discharge of the nozzle 44.

Figure 4:
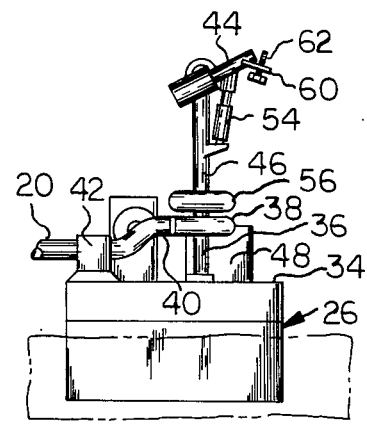
FIG. 4 is an elevational view of the distribution barge.

A diffuser 60, FIG. 4, is mounted adjacent the nozzle discharge end which consists of a projection, such as threaded rod 62, adjustably located within the stream of slurry being discharged from the nozzle 44 to further diffuse the stream in addition to that diffusion occurring at the nozzle and as the slurry is sprayed through the air.

In most cases booster pumps, not shown, are located along the pipe 20, or upon the distribution barge 26, to restore the pressure loss in the pipe and assure a high pressure at nozzle 44. Such booster pumps are of conventional form and their use is known in dredging operations.

In operation, the suction dredge 10 will be operating at a location in the proximity of the distribution barge 26, but generally remote therefrom, and will be connected to the distribution barge by means of the floating hose or pipe 20. The discharge from the suction dredge operation is pumped, under high pressure, into the pump 16 to the distribution barge fitting 42.

The pressurized slurry enters the manifold 38 and is discharged through the nozzle 44 which is directed toward the area 28 to be elevated. The nozzle 44 will, in the arrangement shown in FIG. 1, be oscillated up and down and in a back-and-forth movement to distribute the sprayed material over the area 28, and the elevation of the nozzle will be relatively high so that the slurry will fall rain-like in a relatively fine mist and thereby be uniformly distributed over the area assuring a uniform elevation buildup. The slurry distribution can also be varied by increasing or reducing the pumping pressure. The oscillation of the nozzle is produced by the motor 56 and control unit 48, and may be under manual or automatic operation. If under manual control, care will be taken to assure that the nozzle is kept moving to prevent uneven distribution of the sprayed material.

Of course, the degree of buildup that will occur at area 28 will be determined by the desired specifications. However, in the practice of the invention the increase in elevation of area 28 will be at least 2 inches, and it is the expectation that the elevation will be relatively significant, and be of a foot or greater.

When elevating an area such as at 28 having an "active" shoreline it may be advisable to erect a containment dike or screen 64 to restrain the finely dispersed slurry adjacent the shoreline from dissipating into the water at the shoreline. Such a screen or dike may consist of panels or the like held in position by posts 66, and, if desired, this dike may be removed after the sprayed material has settled and consolidated.

Figure 5:
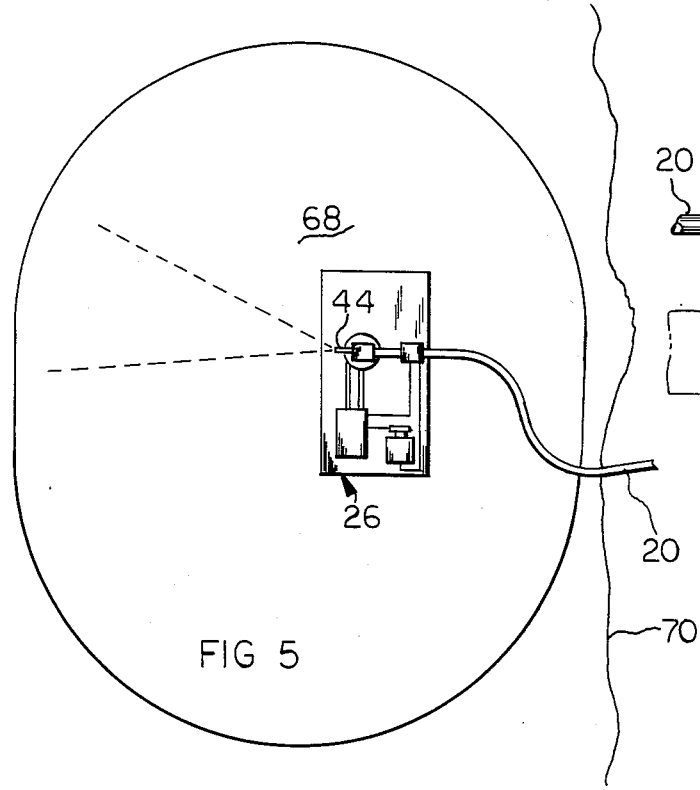
FIG. 5 is a plan view of an arrangement wherein the distribution barge is mounted in the center of the area to be elevated.

In the arrangement shown in FIG. 5, a relatively large area to be elevated is represented at 68, and this arrangement will normally be used with building a marsh. The shoreline is indicated at 70, and the distribution barge 26 is located centrally within the area 68. The nozzle 44 is connected to the supply pipe 20 attached to the suction dredge, not shown, and the nozzle will be slowly rotated by the motor 56 in a clockwise or counterclockwise direction to distribute the slurry 360° about the distribution barge and the vertical angle of the nozzle 44 will be varied periodically to insure uniform slurry distribution. In this manner a maximum area is covered with a uniform distribution of slurry and attention by the operator is minimized. By adjustment of the diffuser 60 and the angle of the nozzle 44, a rain-like distribution of the material over the area 68 is possible wherein the composition of the sprayed material will be substantially uniform throughout the area.

Once the area 68 has been built up to the desired elevation, the distribution barge 26 is moved to the next area, which may be adjacent thereto, and the operation repeated. If the area 68 is solid enough the nozzle 44 and associated apparatus may be mounted on other types of platforms than a barge, for instance, a land-supported vehicle, amphibious vehicles, marsh buggies, ground effect vehicles, etc., would also facilitate movement between adjacent area to be built up.

It will be appreciated that the practice of the method of the invention permits marshes to be built, and beaches to be restored, wherein close elevational control of the area being built up may be maintained. The spraying distribution of the slurry, and the rain-like dispersion thereof permits a substantially uniform composition to be distributed over relatively large areas without segregation, and it is appreciated that various modifications to the invention may be apparent to those skilled in the art without departing from the spirit and scope of the invention.

I claim:

1. The method of building marshes and beaches by raising the elevation thereof using a pumpable water-based slurry comprising the steps of:
   (a) removing small solid inorganic material particles from the bottom of a body of water,
   (b) mixing the small solid material particles with a large volume of water to form a pumpable slurry of intermixed particles of variable size,
   (c) pumping the slurry to a location remote from the location of mixing, and
   (d) spraying the pumped slurry through the air under high pressure through a nozzle rotating about a substantially vertical axis over a predetermined area in such a manner as to substantially evenly distribute the various sizes of material particles over said predetermined area and permanently build up said area to a predetermined elevation greater than two inches above the elevation at the beginning of spraying.

2. The method of building marshes and beaches as in claim 1 including the step of:
   (a) containing at least a portion of said predetermined area to confine the slurry sprayed thereon.

3. The method of building marshes and beaches as in claim 1 wherein the spraying of the pumped slurry over said predetermined area occurs by directing the sprayed slurry in an alternating back-and-forth motion over said area while varying the vertical elevation thereof.

4. The method of building marshes and beaches as in claim 3 including the step of:
   (a) varying the pressure of the pumped slurry to control the distribution thereof over said predetermined area.

5. The method of building marshes and beaches as in claim 1 wherein the spraying of the pumped slurry over said predetermined area occurs by directing the pumped slurry from a common location in a circular path of movement while varying the vertical elevation thereof.

6. The method of building marshes and beaches as in claim 5 including the step of:
   (a) varying the pressure of the pumped slurry to control the distribution thereof over said predetermined area.

7. The method of building marshes and beaches as in claim 1 wherein the spraying of said pumped slurry over said predetermined area is automatically controlled to assure a substantially even distribution of slurry over said area.

8. The method of building marshes and beaches as in claim 1, including the step of:
   (a) diffusing the spray of pumped slurry at the nozzle to facilitate the even distribution of said slurry.

9. The method of building marshes and beaches by raising the elevation thereof using a suction dredge comprising the steps of:
   (a) removing the inorganic solid material from the bottom of a body of water,
   (b) mixing the removed solid material with a large volume of water to form a pumpable slurry of intermixed solid particles of variable size,
   (c) supporting a nozzle for rotation about a substantially vertical axis on a vehicle separate from the suction dredge and remotely located from the suction dredge and the location of solid material removal, (d) pumping the slurry under high pressure to the nozzle, and (e) spraying the pumped slurry through the air under high pressure through the nozzle over a predetermined area in such a manner as to substantially evenly distribute the various sizes of material particles over said predetermined area and permanently build up said area to a predetermined elevation greater than two inches above the elevation at the beginning of spraying.

10. The method of building marshes and beaches as in claim 9 including the step of:

(a) containing at least a portion of said predetermined area to confine the slurry sprayed thereon.

11. The method of building marshes and beaches as in claim 9 wherein the spraying of the pumped slurry over said predetermined area occurs by directing the sprayed slurry in an alternating back-and-forth motion over said area while varying the vertical elevation thereof.

12. The method of building marshes and beaches as in claim 11 including the step of:

(a) varying the pressure of the pumped slurry to control the distribution thereof over said predetermined area.

13. The method of building marshes and beaches as in claim 9 wherein the spraying of the pumped slurry over said predetermined area occurs by directing the pumped slurry from a common location in a circular path of movement while varying the vertical elevation thereof.

14. The method of building marshes and beaches as in claim 13 including the step of:

(a) varying the pressure of the pumped slurry to control the distribution thereof over said predetermined area.

15. The method of building marshes and beaches as in claim 9 wherein the spraying of said pumped slurry over said predetermined area is automatically controlled to assure a substantially even distribution of slurry over said area.

16. The method of building marshes and beaches as in claim 9, including the step of:

(a) diffusing the spray of pumped slurry at the nozzle to facilitate the even distribution of said slurry.

* * * * *